United States Patent
Yamada (10) Patent No.: US 6,188,902 B1
(45) Date of Patent: Feb. 13, 2001

(54) MULTIPLE COMMUNICATION SYSTEM, EXCHANGE, AND TERMINAL DEVICE

(75) Inventor: Yoshiko Yamada, Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/392,453

(22) Filed: Sep. 9, 1999

Related U.S. Application Data (63) Continuation of application No. PCT/JP99/00823, filed on Feb. 24, 1999.

(51) Int. Cl.[7] ............................................. H04Q 7/24
(52) U.S. Cl. ........................ 455/445; 455/461; 455/426; 379/219; 379/220
(58) Field of Search ............................ 455/426, 427, 455/428, 461, 422, 445, 560, 575; 379/219, 220, 221

(56) References Cited

U.S. PATENT DOCUMENTS

| | | | |
|---|---|---|---|
| 4,672,656 | * | 6/1987 | Pfeiffer et al. ......................... 455/427 |
| 5,506,887 | * | 4/1996 | Emery et al. ......................... 455/461 |
| 5,878,126 | * | 3/1999 | Velamuri et al. ..................... 379/219 |
| 5,920,805 | * | 7/1999 | Foladare et al. ..................... 455/426 |
| 5,946,629 | * | 8/1999 | Sawyer et al. ....................... 455/426 |
| 6,006,094 | * | 12/1999 | Lee ....................................... 455/461 |

FOREIGN PATENT DOCUMENTS

| | | | |
|---|---|---|---|
| 6261150 | 9/1994 | (JP) . | |
| 7226973 | 8/1995 | (JP) . | |
| 10174143 | 6/1998 | (JP) . | |
| 10-262284 | * 9/1998 | (JP) | ............................ H04Q/7/38 |

* cited by examiner

Primary Examiner—Reinhard J. Eisenzopf
Assistant Examiner—Eliseo Ramos-Feliciano
(74) Attorney, Agent, or Firm—Rothwell, Figg, Ernst & Manbeck

(57) ABSTRACT

A multiple communication system is comprised of a plurality of communication networks including mobile communication networks. The plurality of communication networks are connected to each other by exchanges. Terminal devices including mobile terminal devices belong to respective communication networks and can communicate with each other via the exchange in the communication network in which the terminal device is accommodated. When a call is originated, the terminal device sends a designated call incoming code for specifying a destination mobile communication network for connection. The exchange connects to the mobile communication network corresponding to the designated incoming call code received from the terminal device.

8 Claims, 10 Drawing Sheets

MULTIPLE COMMUNICATION SYSTEM, EXCHANGE, AND TERMINAL DEVICE

CROSS-REFERENCE TO THE RELATED APPLICATION

This Application is a continuation of International Application No. PCT/JP99/00823, whose International filing date is Feb. 24, 1999, the disclosures of which Application are incorporated by reference herein.

BACKGROUND OF THE INVENTION

1. Field of the Invention

The present invention generally relates to multiple communication systems, exchanges and terminal devices and, more particularly, to a multiple communication system composed of a plurality of communication networks including mobile communication networks, and to exchanges and terminal devices used in such a system, capable of efficiently processing messages incoming to mobile terminal devices moving in the network.

2. Description of the Related Art

Figure 9:
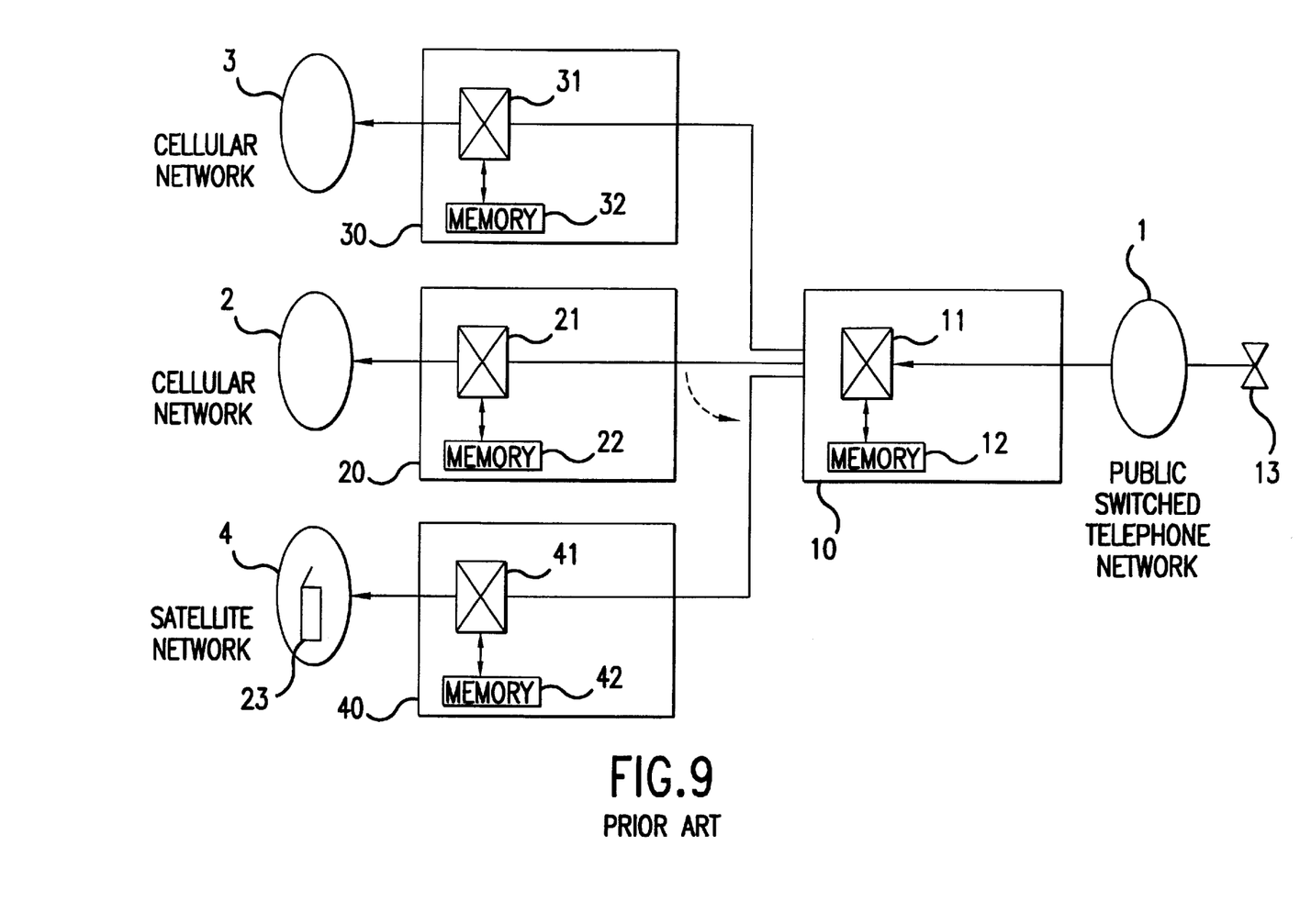
FIG. 9 is a system block diagram of the multiple communication system.

A description will now be given of the related art. FIG. 9 is a system block diagram of a multiple communication system. Communication networks constituting a multiple communication system include point-to-point communication networks and mobile communication networks. In FIG. 9, numeral 1 indicates a public telephone network (point-to-point communication network), 2 and 3 indicate cellular communication networks (mobile communication networks), and 4 indicates a satellite communication network (mobile communication network). The coverage of each of the communication networks may or may not overlap geographically. Numeral 10 indicates a public exchange, 20 and 30 indicate cellular exchanges and 40 indicates a satellite exchange. Exchanges are classified into three categories according to the function thereof: gateway exchanges that serve as gateways connecting a home communication network with another communication network; subscriber exchanges connected to subscriber terminal devices; and relay exchanges for connecting and relaying between a plurality of subscriber exchanges. A generic term of "exchange" will be used if the type of the communication network to which the exchange belongs and the function thereof are to be disregarded. The public telephone network 1, the cellular communication networks 2, 3, and the satellite communication network 4 are connected with each other via the exchanges. It is assumed that the exchanges shown in FIG. 9 include the functions of a gateway exchange and a subscriber exchange. The public exchange 10, the cellular exchanges 20, 30, and the satellite exchange 40 are similarly constructed. The public exchange 10 is comprised of a control circuit 11 and a memory 12; the cellular exchange 20 is comprised of a control circuit 21 and a memory 22; the cellular exchange 30 is comprised of a control circuit 31 and a memory 32; and the satellite exchange 40 is comprised of a control circuit 41 and a memory 42. Numeral 13 indicates a terminal device which belongs to the public telephone network 1, and 23 indicates a dual-mode mobile terminal device which belongs to the mobile communication network. The dual-mode mobile terminal device is adapted to a plurality of communication modes and can communicate even when it moves to a mobile communication network other than the home mobile communication network to which it originally belongs.

Figure 10:
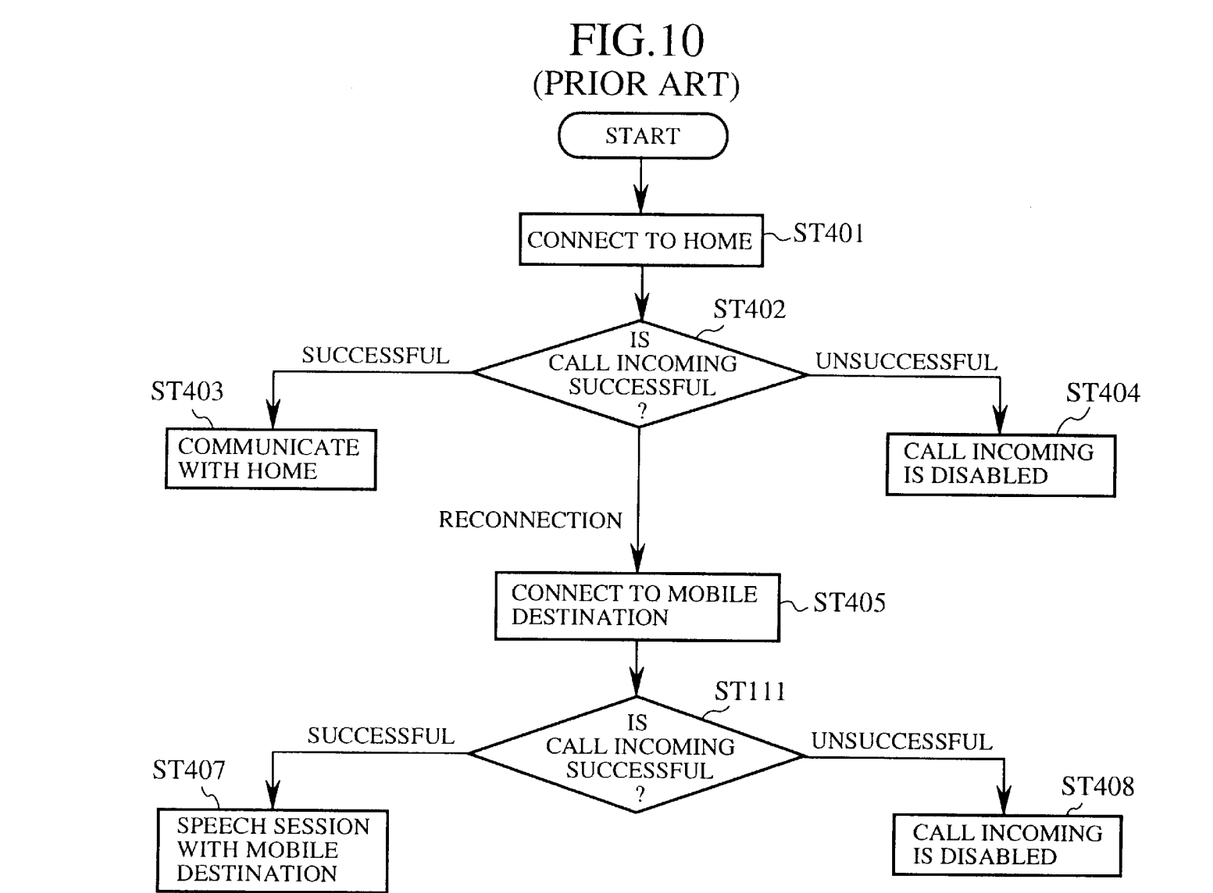
FIG. 10 is a flowchart showing the operation of a multiple communication system according to the related art.

FIG. 10 is a flow chart showing the operation of the related-art multiple communication system. A description will be given of the operation of the related-art multiple communication system with reference to this flow chart. It is assumed that the home communication network for the dual-mode mobile terminal device 23 is the cellular communication network 2, and that the dual-mode mobile terminal device 23 is away from the home network and moving to the satellite communication network 4. The position registration information of the dual-mode mobile terminal device 23 is registered in the memory 42 of the satellite exchange 40 in the destination satellite communication network 4 as well as in the memory 22 of the cellular exchange 20 in the home cellular communication network 2. It is assumed that terminal device 13 issues a call to the dual-mode mobile terminal device 23. When a connection request signal from the terminal device 13 is sent to the public exchange 10 in the public telephone network 1, the public exchange 10 recognizes that the home of the mobile terminal device 23 is the cellular communication network 2 by referring to the telephone number information contained in the connection request signal so as to forward the connection request signal to the cellular exchange 20 (step ST401). The cellular exchange 20 examines the memory 22 and, if it is determined that the dual-mode mobile terminal device 23 is located in the cellular communication network 2, processes the incoming call. When the dual-mode mobile terminal device 23 is not engaged in a call so that the call incoming process is successful, control is turned to a speech session mode (steps ST402 and ST403). If the dual-mode mobile terminal device 23 is located in the home cellular communication network 2 but a telephone call is already proceeding or the power supply is turned off, the call incoming process is unsuccessful (steps ST402 and ST404). When the dual-mode mobile terminal device 23 is away from the home network and moving to the satellite communication network 4, as assumed in this case, the cellular exchange 20 recognizes that the destination for connection is the satellite communication network 4, based on the position registration information which is related to the telephone number information of the dual-mode mobile terminal device and which is registered in the memory 22. Thereupon, the cellular exchange 20 informs the public exchange 10 of the destination for connection. The public exchange 10 then sends the connection request signal to the satellite exchange 40 (step ST405). The satellite exchange 40 forwards the connection request signal to the dual-mode mobile terminal device 23 so that a call incoming process is performed. When the call incoming process is successful, control is turned to a speech session mode (steps ST406 and ST407). If the call incoming process is unsuccessful, notification of a failure of call incoming is returned to the call originating terminal device 13 (steps ST406 and ST408).

Japanese Laid-Open Patent Application No. 57-99853 discloses a traffic control method designed to evade overcrowding of a terrestrial circuit in an area where the coverage of the terrestrial circuit and a satellite circuit overlap, by selecting only the satell ite circuit for calls identified by a designated call incoming code even when connection via the terrestrial circuit is available.

A disadvantage of the related-art multiple communication system is that the exchange in the home communication network is examined first .According to this approach, when the mobile terminal device is away from the home communication network, it takes a relatively long period of time before the connection is established due to a complicated intervening network construction comprised of a plurality of terrestrial networks and satellite networks. The method disclosed in Japanese Laid-Open Patent Application No.

57-99853 is designed to evade overcrowding of communication in an area where the coverage of a communication line of one type overlaps that of a communication of another type. For this reason, Japanese laid-Open Patent Application No. 57-99853 fails to resolve the problem of an extended period of time needed to establish a connection. The designated call incoming code according to the related art merely enables selection of the satellite network. Therefore, users cannot select a type of connection suited to their needs. That is, users cannot select options like "terrestrial network only", "priority to satellite network" or "priority to terrestrial network".

SUMMARY OF THE INVENTION

Accordingly, an object of the present invention is to provide a multiple communication system, an exchange and a terminal device in which the aforementioned disadvantages are eliminated.

Another and more specific object is to provide a multiple communication system, an exchange and a terminal device in which the connection time is reduced, the communication cost is reduced, and a circuit preferred for connection can be arbitrarily selected.

The aforementioned objects can be achieved by a multiple communication system comprised of a plurality of communication networks including mobile communication networks, each of the plurality of communication networks being connected via exchanges, terminal devices, including mobile terminal devices, belonging to respective ones of the plurality of communication networks being capable of communicating with each other via the exchange in the communication network accommodating the terminal device, wherein when a call is originated, the terminal device sends a designated call incoming code specifying a destination mobile communication network for connection, and the exchange connects to the mobile communication network corresponding to the designated call incoming code received from the terminal device.

The mobile communication networks may include satellite communication networks and cellular communication networks.

The exchange in the communication network accommodating a call origination terminal device may reconnect to a home communication network to which a call destination mobile terminal device originally belongs, when the call destination mobile terminal device is not found to be accommodated in the mobile communication network corresponding to the designated call incoming code.

When the home communication network to which the call destination mobile terminal device originally belongs is a satellite communication network, the exchange in the communication network accommodating the call origination terminal device may confirm with the call origination terminal device as to whether to connect to the satellite communication network.

The aforementioned objects can also be achieved by an exchange for use in a multiple communication network comprised of a plurality of communication networks including mobile communication networks, each of the plurality of communication networks being connected via exchanges, terminal devices, including mobile terminal devices, belonging to respective ones of the plurality of communication networks being capable of communicating with each other via the exchange in the communication network accommodating the terminal device, wherein the exchange connects to the mobile communication network corresponding to a designated call incoming code received from the terminal device.

The exchange may send a message to a call origination terminal device when a call destination terminal device is not accommodated in the mobile communication network corresponding to the designated call incoming code, the message prompting confirmation as to whether a reconnection is to be made to a home communication network to which the call destination terminal device originally belongs.

The present invention also provides a terminal device for use in a multiple communication network comprised of a plurality of communication networks including mobile communication networks, each of the plurality of communication networks being connected via exchanges, terminal devices, including mobile terminal devices, belonging to respective ones of the plurality of communication networks being capable of communicating with each other via the exchange in the communication network accommodating the terminal device, wherein the terminal device enables a key input of a designated call incoming code specifying a destination mobile communication network for connection, when a call is issued to a mobile terminal device.

The terminal may output a message in the form of a display or voice when a call destination terminal device is not accommodated in the mobile communication network corresponding to the designated call incoming code, the message being sent from the exchange and prompting confirmation as to whether a reconnection is to be made to a home communication network to which the call destination terminal device originally belongs.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

A detailed description of the present invention will be given with reference to the accompanying drawings. The system block diagram of FIG. 9 applies to the present invention.

Figure 1:
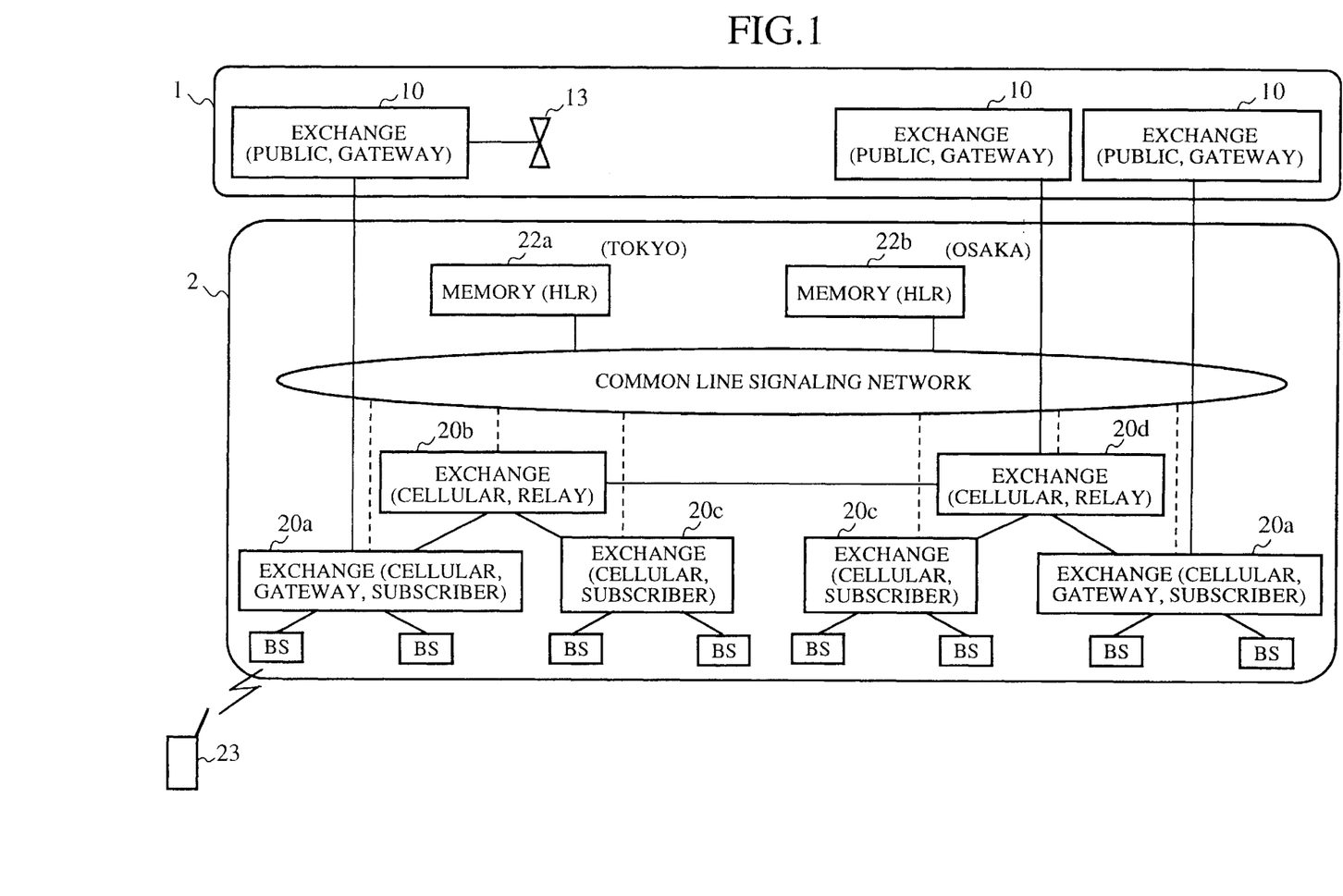
FIG. 1 is a detailed system block diagram of a multiple communication system (digital mobile communication network)

A detailed description will be given of the construction and operation of a multiple communication system according to the first embodiment. FIG. 1 is a detailed system block diagram of a multiple communication system (digital mobile communication network). It is assumed that the public telephone network 1 and the cellular communication network 2 of FIG. 9 constitute the multiple communication network. Referring to FIG. 1, annotations in () after the notation "exchange" indicate the communication network to which the exchange belongs and the functions allocated to the exchange. For example, an exchange 20a (cellular, gateway, subscriber) is a cellular exchange having the function of a gateway exchange and the function of a subscriber exchange. The same convention is used to annotate the other exchanges as well. Namely, the type of communication network to which the exchanges belongs is given first, followed by the functions provided in the exchange. In order to highlight the function of a gateway exchange, the exchange 20a is referred to as the exchange (gateway) 20a; and, in order to highlight the function of a subscriber exchange, the exchange (subscriber) 20a. Referring to FIG. 1, the public exchange 10 in the public telephone network 1 may be connected to the nearest cellular exchange (gateway) 20a in the cellular communication network 2. The cellular communication network 2 is connected to the public telephone network 1 via the exchange (gateway) 20a and the exchange (gateway) 20d. A plurality of base stations (BS) are connected to each of the exchange (subscriber) 20a and a exchanges (subscriber) 20c. A plurality of exchanges (subscribers) are connected to each of an exchange (relay) 20b and an exchange (relay) 20d. Thus, a hierarchical construction for connection is established. The cellular exchange 20 shown in FIG. 9 corresponds to the cellular exchanges (gateway) 20a and 20d in FIG. 1. The memories 22a and 22b are called HLRs (home location registers) and correspond to the memory 22 of FIG. 9. A HLR is installed at a plurality of locations (for example, Tokyo and Osaka) to store various information (location registration information, subscriber information and billing information) related to the mobile terminal devices of the subscribers. While the memory 22 of FIG. 9 is described as being included in the cellular exchange, the memories of FIG. 1 are shared in the communication network and are illustrated as being separate from the exchanges. Assuming that the telephone number of the mobile terminal device 23 is 010-123-4567, "010" is a network identification number. That is, it indicates that the mobile terminal device 23 belongs to the cellular communication network 2. "123" is a home identification number indicating that the mobile terminal device 23 is basically used in Osaka. "4567" is a subscriber number. The memory 22b (Osaka) stores the subscriber information and serves as a home memory for the mobile terminal device 23. When the terminal device 13 in the public telephone network calls the dual-mode mobile terminal device 23, "010" in the telephone number is decoded by the public exchange 10 so that the call is connected to the nearest cellular exchange 20a in the cellular communication network 2. The cellular exchange 20a identifies the location of the home memory by referring to "123" in the telephone number and issues an inquiry for subscriber information to the memory 22b located in Osaka via the common line signaling network (signaling network shared in the communication network to transfer information). When the current destination for connection of the dual-mode mobile terminal device 23 (that is, the identity of the base station BS covering the mobile terminal device 23) is determined, the cellular exchange 20a connects to the identified connection destination.

Figure 2:
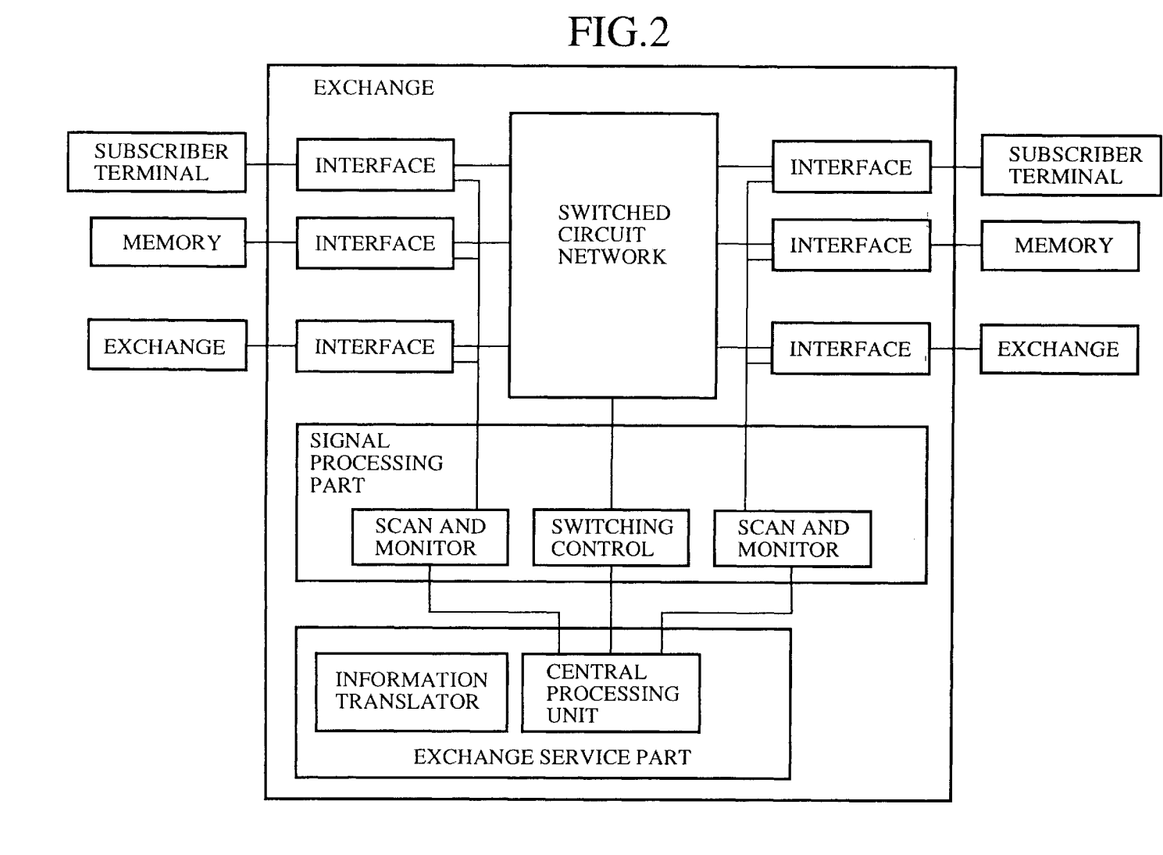
FIG. 2 is a block diagram showing the construction of an exchange.

A description will now be given of the operation of the exchange. FIG. 2 is a block diagram showing the construction of the exchange. The construction shown in FIG. 2 is common to the public exchange 10, the cellular exchanges 20, 30, the satellite exchange 40. In another respect, the construction is common to the subscriber exchanges 20c, the gateway exchange 20a and the relay exchanges 20b, 20d. As shown in FIG. 2, subscriber terminals, memories and adjacent exchanges are connected to the exchange. For example, the telephone number transferred from a call originating terminal device (to the left of the exchange, according to the illustration) is decoded by a switching control part provided with control information from a central processing unit, so that a switch control signal is generated. Switching of call connections is performed in the switched circuit network in accordance with the switch control signal so that a connection is made to the adjacent exchange (to the right of the exchange, according to the illustration). A scan and monitor part periodically monitors the status change of a signal line for carrying subscriber signals and the like so as to detect a telephone number and the like. The central processing unit executes an exchange program on a sequential basis and transfer control information with a signal processing part. An information translator performs data conversion (translation of numbers, for example) necessary to determine a destination for connection, in accordance with the subscriber information and the like.

Figure 3:
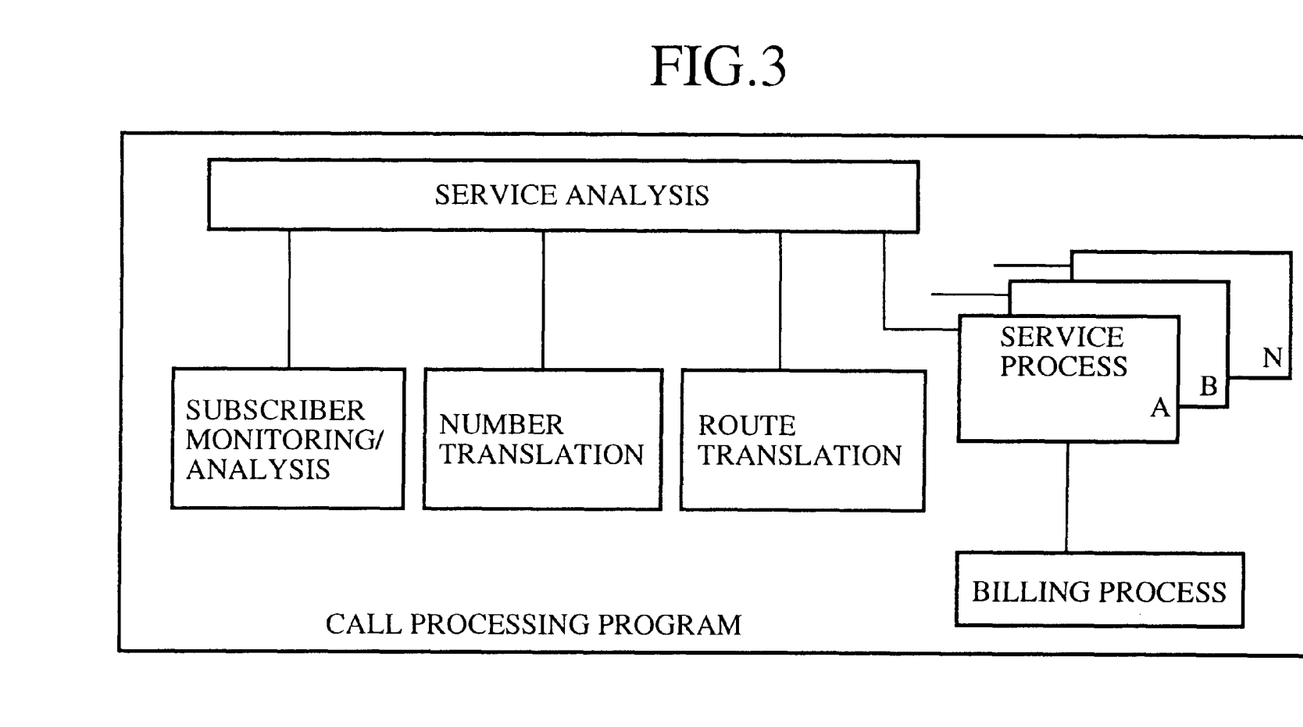
FIG. 3 is diagram showing the construction of an exchange program built in the exchange.

FIG. 3 is a diagram-showing the construction of an exchange program of the exchange and depicts an internal process of the switching control part of FIG. 2. Referring to FIG. 3, a connection control signal sent from the call originating terminal device is analyzed by a service analyzing unit. The telephone number is analyzed by a number translation unit so as to determine an exchange to be contacted for connection. A route translation unit determines a route in the communication network to which the route translation unit is attached. Connections are then appropriately switched in the switched circuit network.

As has been described, the network identification number and the home identification number included in the higher-order digits of the telephone number are used to determine the communication network to which the mobile terminal device belongs and the location of the home memory. In the above description, it is assumed that the highest three digits indicate the home identification number. However, other arrangements are also possible.

Figure 4:
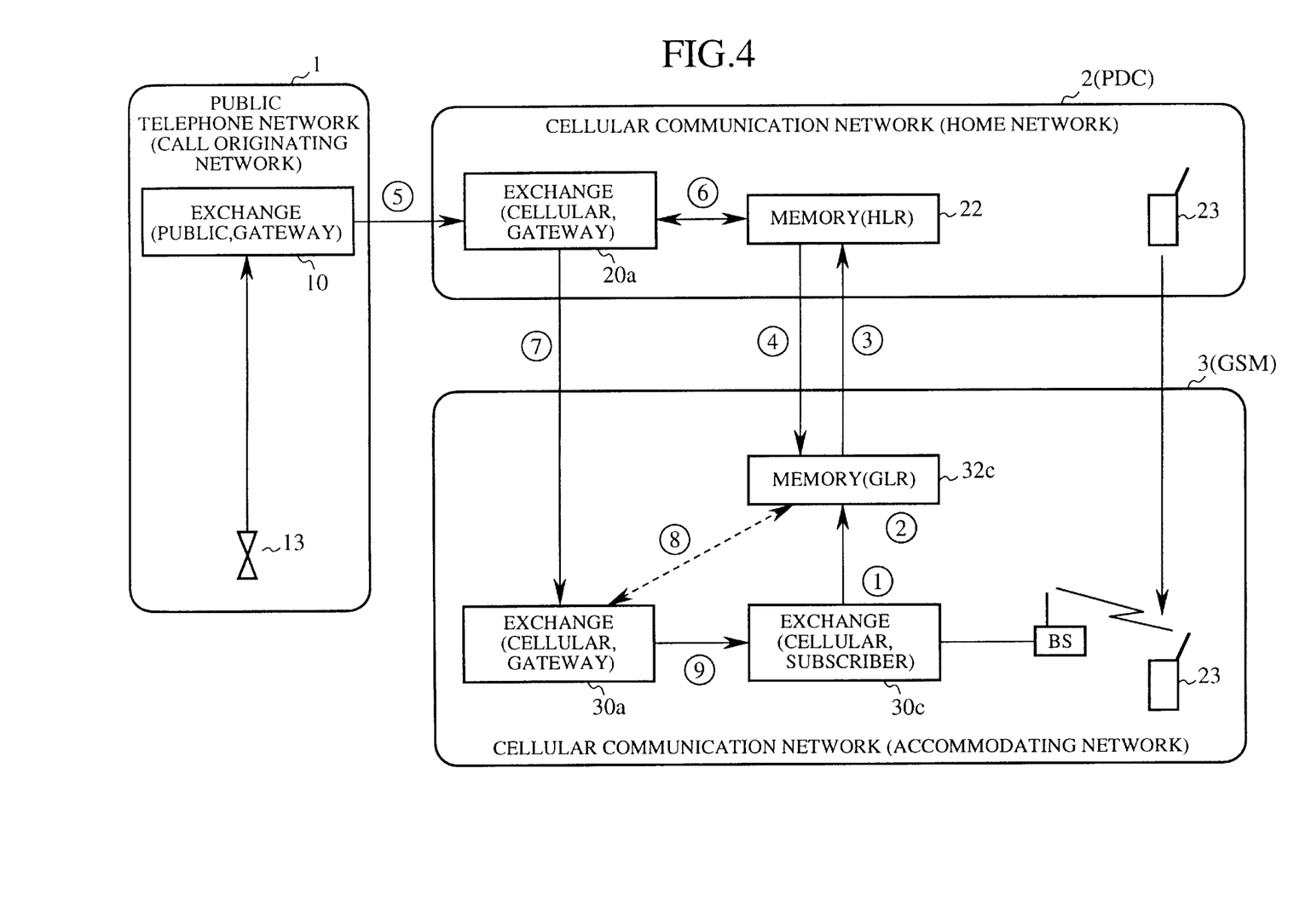
FIG. 4 is a diagram-showing a roaming method in a multiple communication system.

FIG. 4 is a diagram showing a roaming method effected between communication networks in the multiple communication system. FIG. 4 illustrates a procedure of communication effected when the dual-mode mobile terminal 23 moves to a mobile communication network other than the home mobile communication network to which the terminal device 23 originally belongs. The procedure will be described with respect to a system comprised of the public telephone network 1, the cellular communication network 2 and the cellular communication network 3. Referring to FIG. 4, the functions of the exchanges 10, 20a, 30a and 30c are the same as those described with reference to FIG. 1. A memory 32c is called a GLR (gateway location register) which is part of the memory 32 of FIG. 9. The memory 32c stores the subscriber information and the like of the terminal device which is based in a remote communication network (in this case, the cellular communication network 2). It is assumed that the home communication network of the mobile terminal device 23 (indicated as "home network" in FIG. 4) is a PDC network (digital communication system used widely in Japan) and the communication network to which the terminal device moves (indicates as "accommodating network" in FIG. 4) is a GSM network (digital communication system widely used in Europe and Asia). When the dual-mode mobile terminal device 23 moves to Europe and its position is registered (1), the exchange 30c accesses the memory (GLR) 32c in the accommodating network (2) and notifies the memory 22 of the home network that the roaming-from the accommodating network to the home network is effected (3). Additionally, the exchange 30c causes the subscriber information and the like from the memory (HLR) 22 to be copied to the memory GLR 32c. The call originated by the terminal device 13 accommodated in the public telephone network 1 (indicated as "call originating network" in FIG. 4) is routed first to the home network (5). When it is determined that the roaming is being effected by examining the home memory HLR 22, the connection request signal is transferred to the accommodating network (7). Thereupon, the memory GLR 32c is examined in the accommodating network (8) so that an automatic tracking is performed (9). As described later, the present invention features insertion of a designated call incoming code in a telephone number. By analyzing the designated call incoming code in the exchange 10, the exchange 10 is capable of connecting directly to the exchange (cellular, gateway) 30a of the accommodating network.

Figure 5:
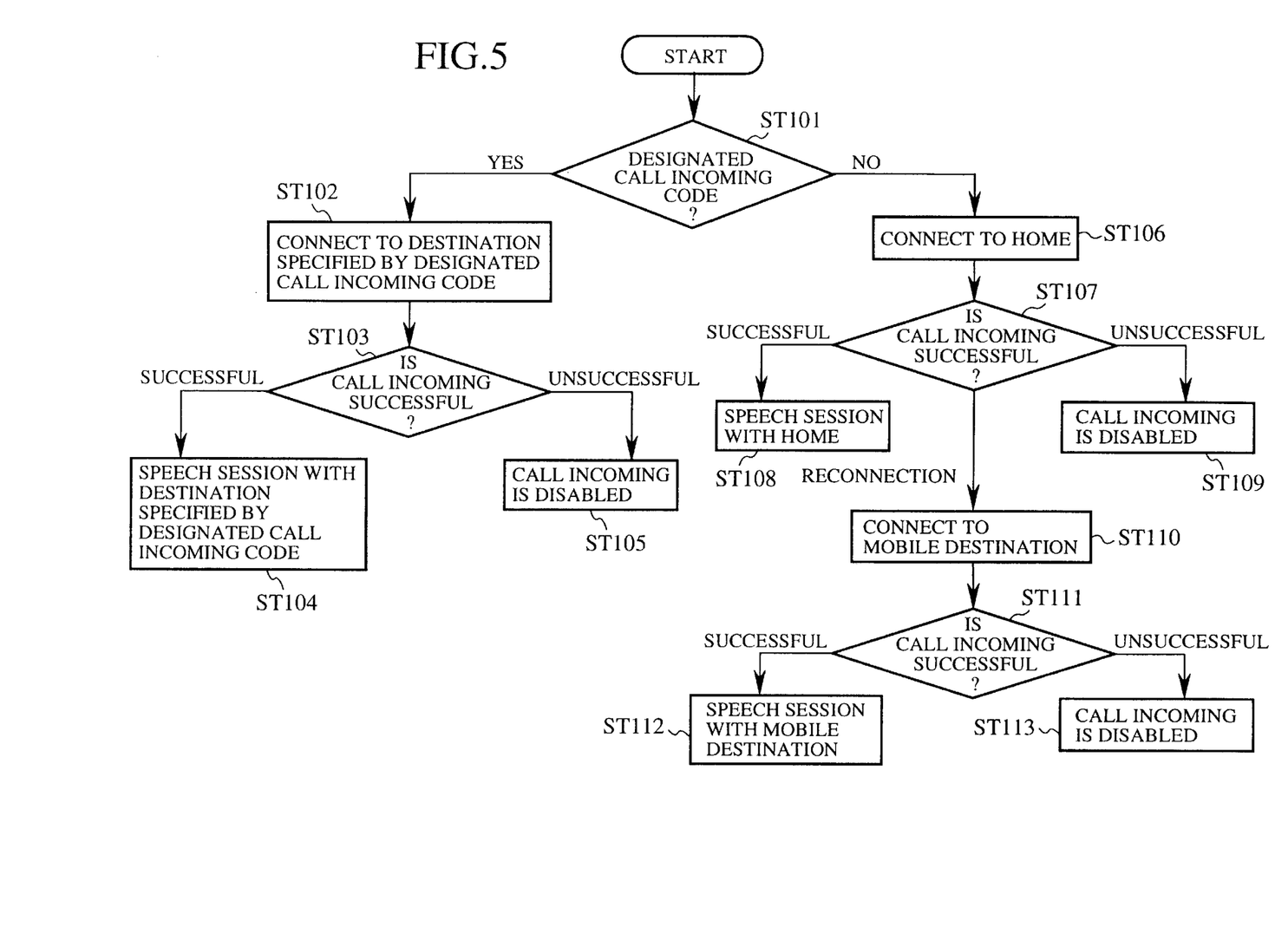
FIG. 5 is a flowchart showing the operation of the multiple communication system according to the first embodiment of the present invention.
Figure 6:
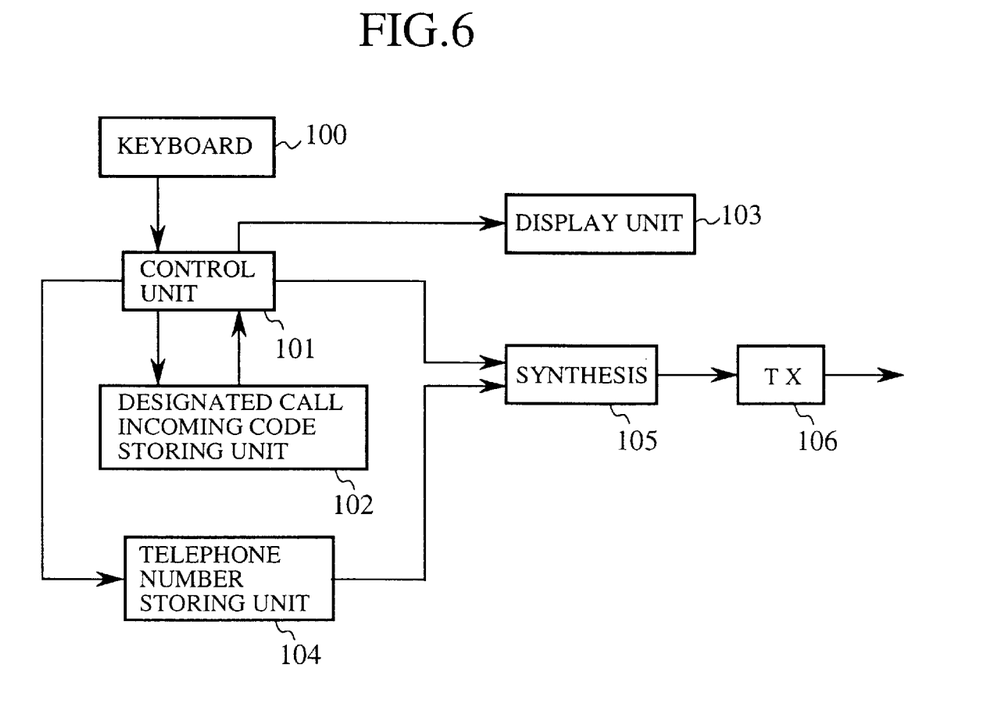
FIG. 6 is a block diagram showing the construction of a terminal device according to the present invention.

A detailed description will now be given of the present invention. FIG. 5 is a flowchart showing the operation of the multiple communication system according to the present invention. The system block assumed in the present invention is the same as that illustrated in FIG. 9. It is assumed in the description that follows that the home communication network of the dual-mode mobile terminal device 23 is the cellular communication network 2 and that the dual-mode mobile terminal device 23 is away from the home network and is moving toward the satellite communication network 4. The position registration information of the dual-mode mobile terminal device 23 is registered both in the memory 22 of the cellular exchange 20 in the cellular communication network 2 and in the memory 42 of the satellite exchange 40 in the satellite communication network 40. It is assumed that the terminal device 13 issues a call to the dual-mode mobile terminal device 23. The call request signal from the call originating terminal device 13 includes connection control information in the form of a designated call incoming code (9-050) for specifying a destination communication network for connection in addition to the telephone number (010-123-4567) of the requested dual-mode mobile terminal device 23. The designated call incoming code may be added to precede the telephone number. Numeral 9 in the designated call incoming code indicates a reserved connection (direct connection to a specific exchange designated by the call originating terminal); and 050 indicates a satellite communication network. The user inputs the designated call incoming code using, for example, a key provided in the terminal device. The user may input the designated call incoming code using the key every time a call is originated. Alternatively, the code may be input and registered so that the user can retrieve the same when a call is originated. The method of inputting and registering the code will be described with reference to FIG. 6, which is a block diagram showing the construction of the terminal device. Referring to FIG. 6, numeral 100 indicates a keyboard. The designated call incoming code set up by the user using the keyboard 100 is sent to a control unit 101. The control unit 101 writes the input designated call incoming code in a designated call incoming code storing unit 102. When originating a call, the user uses the keyboard 100 to cause the control unit 101 to retrieve the content of the designated call incoming code storing unit 102. The content of the designated call incoming code storing unit 102 is displayed in a display unit 103. The user then makes a selection of a specific communication network and a home network. When a telephone number is input using the keyboard 100, the control unit 101 inputs the telephone number to a telephone number storing unit 104. The designated code and the telephone number are synthesized in a synthesis unit 105 before being transmitted via a transmission unit 106. The terminal device of FIG. 6 is assumed to be a mobile terminal device. In the case of a fixed terminal in the public communication network, the transmission unit 106 is omitted.

Figure 7:
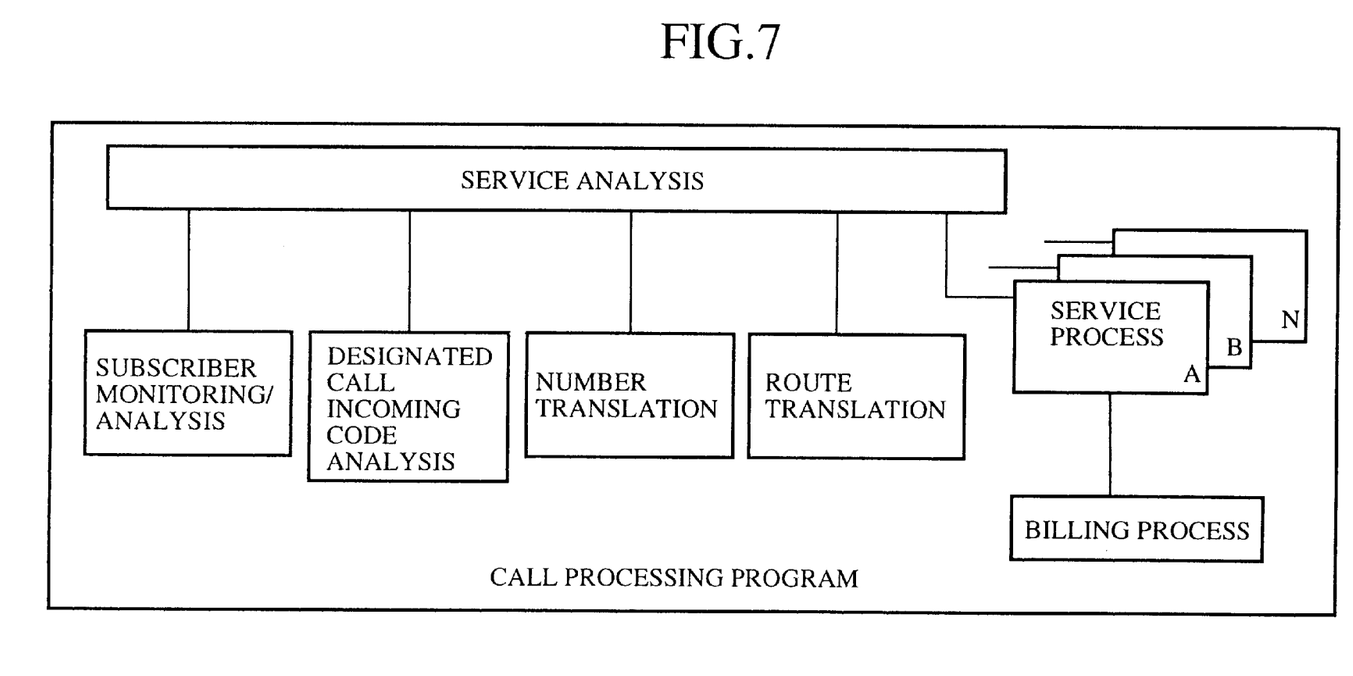
FIG. 7 is a diagram showing the construction of an exchange program built in the exchange according to the present invention.

Referring again to FIG. 5, it is assumed that the designated call incoming code indicating that "satellite communication network 4 only" is inserted in the call request signal. The public exchange 10 determines whether a designated call incoming code is included in the call request signal (step ST101). When there is a designated call incoming code included in the call request signal, the public exchange 10 forwards the call request signal directly to the satellite exchange 40 instead of the cellular exchange 20 (step ST102). Thereupon, the satellite exchange 40 forwards the call request signal to the mobile terminal device 23 so that a call incoming process is performed. If the dual-mode mobile terminal device 23 is not engaged in a call so that the call incoming is successfully processed, control is turned to a speech session (steps ST103, ST104). If the dual-mode mobile terminal device 23 is not accommodated in the satellite communication network 4 or if it is engaged in a telephone call or if the power is turned off, the call incoming process is unsuccessful. Information indicating that the call incoming is disabled is returned to the call originating terminal device 13 so that the process is terminated (steps ST103 and ST104). The information returned may include information relating to the cause of the failure of the call. According to this operation, the satellite communication network 4 can be directly accessed when it is known that the terminal is not located in the home cellular communication network, resulting in reduction of the connection time. A description will now be given of the construction of an exchange program according to the invention. FIG. 7 is a diagram showing the construction of an exchange program provided in the exchange according to the present invention and depicts an internal process of the switching control part of FIG. 2. Referring to FIG. 7, a connection control signal sent from the user is analyzed by a service analyzing unit. When the designated call incoming code is included, the code is analyzed by a designated call incoming code analyzing unit and the call process is relayed to another communication network. As in the case of FIG. 3, when the designated call incoming code is not included, the telephone number is analyzed by a number translation unit so as to determine the exchange to be contacted for connection. A route translation unit determines a route in the communication network to which the route translation unit is attached. Connections are then appropriately switched in the switched circuit network. The subscriber monitoring/analyzing unit determines a contract plan and a service type, which are attributes of a call originating terminal, by analyzing the subscriber information. A service process unit executes such processes as a call origination/call incoming restriction (option for prohibiting non-authorized terminals to originate or receive a call) and a call transfer service. A billing process unit calculates a communication charge in accordance with the call time zone, call distance, call duration, contract plan. For example, the communication charge may be less expensive at night.

Referring again to FIG. 5, when it is determined in step ST101 that the designated call incoming code is not included, step ST106 and subsequent steps are executed, as in the related art.

When it is known that the dual-mode mobile terminal device 23 is accommodated in the cellular communication network 2 or when a connection is not desired, for a reason such as the communication cost, on the condition that the terminal device 23 moves to a communication network besides-the cellular communication network 2, the designated call incoming code may specify a "cellular communication network 2 only" for connection. Such an approach will also reduce the connection time.

Figure 8:
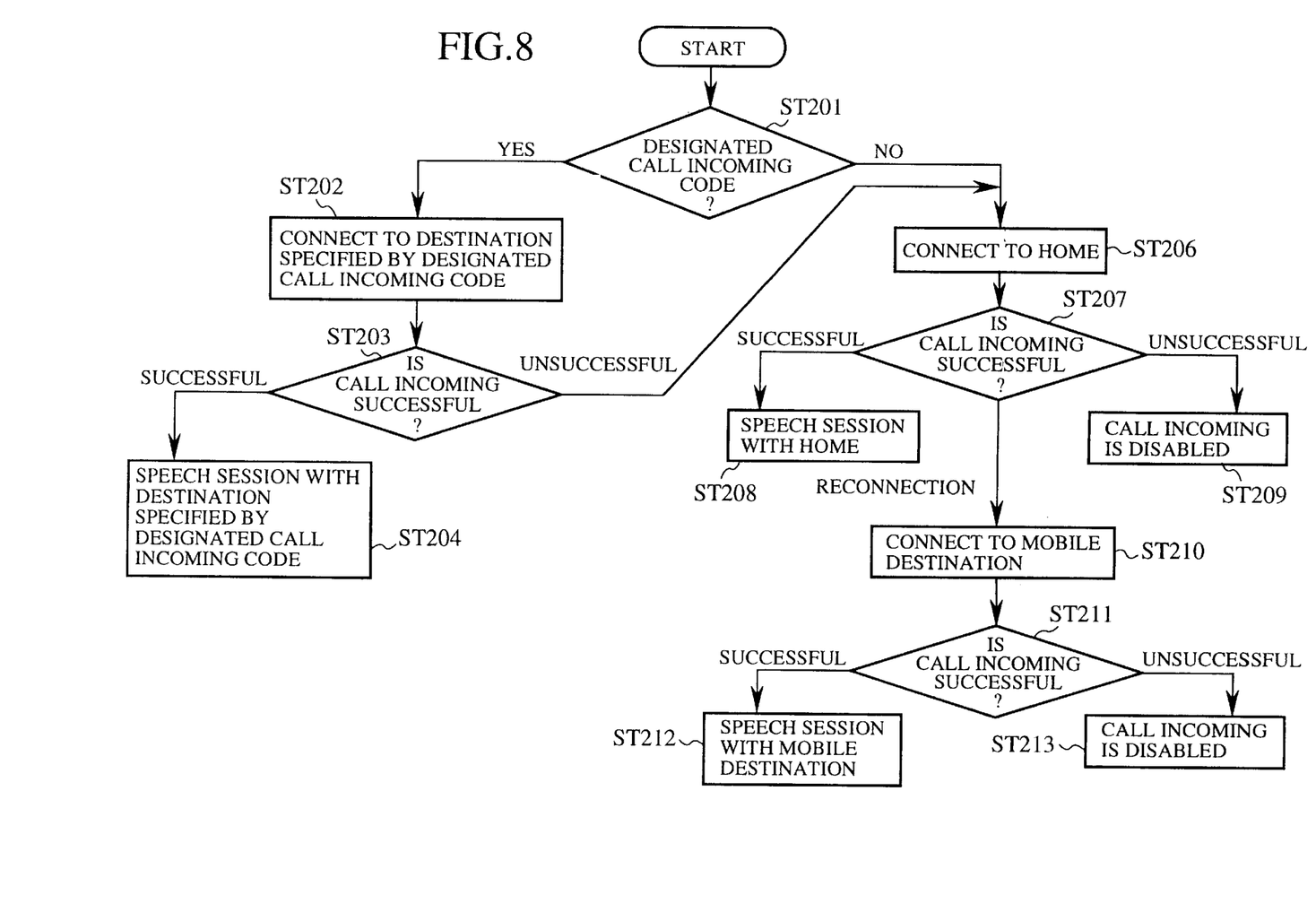
FIG. 8 is a flowchart showing the operation of the multiple communication system according to the second embodiment of the present invention.

In the first embodiment described above, it is assumed that the designated call incoming code specifies "satellite communication network only" or "cellular communication network only". The code may also specify "priority to satellite communication network" or "priority to cellular communication network". In this case, instead of the designated call incoming code of 9 for reserved connection, a code of 8 meaning priority connection may be used. As demonstrated by the flowchart of FIG. 8, when the connection to the communication network corresponding to the designated call incoming code is unsuccessful, connection is automatically established to the home communication network (steps ST203, ST206). The other steps are the same as those described with reference to FIG. 5. The merit of reduction of connection time is also available according to the embodiment just described.

When the "priority to the cellular communication network" is specified and the call incoming terminal device is not accommodated in the cellular communication network, a confirmation may be made with the call originating terminal device before connecting to the satellite communication network characterized by a high communication cost, so as to determine if the user wishes to proceed to connection. This approach provides a method of establishing a connection that may be even more suited to the user's needs. The confirmation may be made by displaying a prompt for confirmation in a display unit of the terminal device, or by outputting a voiced prompt for confirmation via a speaker.

The foregoing description highlights the connection using a designated call incoming code. A dual-mode mobile terminal device may have different telephone numbers for the cellular communication network (terrestrial) and for the satellite communication network. In this case, the merit of reduction of connection time is also available by giving priority to satellite when the caller makes a call using the satellite number and giving priority to terrestrial when the caller makes a call using the terrestrial number.

As described, in the multiple communication system according to the invention, a designated call incoming code is attached to a telephone number when a call is originated. Accordingly, in the multiple communication system, exchanges and terminal devices that result, the connection time is reduced, the communication cost is reduced, the circuit preferred for connection is arbitrarily selected.

The present invention is not limited to the above-described embodiments, and variations and modifications may be made without departing from the scope of the present invention.

What is claimed is:

1. A multiple network communication system comprising:
    a plurality of mobile communication networks and at least one terrestrial communication network, each of the plurality of communication networks being connected to each other via exchanges; and
    a plurality of terminal devices, including at least a plurality of mobile terminal devices each belonging to a respective one of said plurality of mobile communication networks, and at least one terrestrial communication device belonging to said terrestrial communication network;
    each of said plurality of terminal devices being capable of communicating with another terminal device via said exchanges,
    wherein said mobile terminal devices are capable of moving from an area corresponding to the mobile communication network to which said mobile terminal devices belong to an area served by another one of said mobile communication networks; wherein
        upon originating a call to a mobile terminal device, a terminal device originating said call sends to its associated exchange, in addition to a destination telephone number of said called mobile terminal device, a designated call incoming code specifying a destination mobile communication network on which to attempt to connect to said called mobile terminal device; and
        said associated exchange sends the destination telephone number to the destination mobile communication network designated by said call incoming code to connect said called mobile terminal device with the call originating terminal device via said destination mobile communication network.

2. The multiple network communication system according to claim 1, wherein the mobile communication networks includes satellite communication networks and cellular communication networks.

3. The multiple network communication system according to claim 1, wherein the exchange in the communication network accommodating a call origination terminal device reconnects to a home communication network to which a call destination mobile terminal device originally belongs, when the call destination mobile terminal device is not found to be accommodated in the mobile communication network corresponding to the designated call incoming code.

4. The multiple network communication system according to claim 3, wherein, when the home communication network to which the call destination mobile terminal device originally belongs is a satellite communication network, the exchange in the communication network accommodating the call origination terminal device confirms with the call origination terminal device as to whether to connect to the satellite communication network.

5. An exchange for use in a multiple communication network system comprised of a plurality of communication networks including mobile communication networks, each of the plurality of communication networks being connected via exchanges; terminal devices, including mobile terminal devices, belonging to respective ones of the plurality of communication networks being capable of communicating with each other via the exchange in the communication network accommodating the terminal device, wherein said accommodating exchange connects to the mobile communication network specified by a designated call incoming code received from an accommodated terminal device, in addition to a destination telephone number corresponding to a mobile terminal device received from said accommodated terminal device, and sends said destination telephone number to the mobile communication network specified by said designated call incoming code.

6. The exchange according to claim 5, when in said exchange sends a message to a call origination terminal device when a call destination terminal device is not accommodated in the mobile communication network corresponding to the designated call incoming code, said message prompting confirmation as to whether a reconnection is to be made to a home communication network to which the call destination terminal device originally belongs.

7. A terminal device for use in a multiple communication network system comprised of a plurality of communication networks including mobile communication networks, each of the plurality of communication networks being connected via exchanges; terminal devices, including mobile terminal devices, belonging to respective ones of the plurality of communication networks being capable of communicating with each other via the exchange in the communication network accommodating the terminal device, wherein said terminal device enables a key input of a designated call incoming code specifying a destination mobile communication network for connection, when a call is issued to a destination mobile terminal device, in addition to a key input of a destination telephone number corresponding to said destination mobile terminal device, and terminal device sends said designated call incoming code and said destination telephone number to its associated exchange, which sends the destination telephone number to the mobile communication network specified by said designated call incoming code.

8. The terminal device according to claim 7, wherein said terminal device outputs a message in the form of a display or voice when a call destination terminal device is not accommodated in the mobile communication network corresponding to the designated call incoming code, said message being sent from an exchange and prompting confirmation as to whether a reconnection is to be made to a home communication network to which the call destination terminal device originally belongs.

* * * * *